United States Patent
Mistkawi et al.

(10) Patent No.: US 11,984,000 B2
(45) Date of Patent: May 14, 2024

(54) FIXED RETAIL SCANNER HEAT MANAGEMENT SYSTEM FOR MULTI-PORT NETWORK SWITCH AND RELATED METHODS

(71) Applicant: Datalogic USA, Inc., Eugene, OR (US)

(72) Inventors: Joseph Mistkawi, Tigard, OR (US); Ryan Thompson, Eugene, OR (US); Richard Neel, Eugene, OR (US); Brett Howard, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 0 days.

(21) Appl. No.: 18/081,621

(22) Filed: Dec. 14, 2022

(65) Prior Publication Data

US 2023/0206732 A1 Jun. 29, 2023

Related U.S. Application Data

(60) Provisional application No. 63/293,565, filed on Dec. 23, 2021.

(51) Int. Cl.
*G07G 1/00* (2006.01)
*G06K 7/14* (2006.01)

(52) U.S. Cl.
CPC ............ *G07G 1/0045* (2013.01); *G06K 7/14* (2013.01)

(58) Field of Classification Search
CPC ...... G07G 1/0045; G07G 1/0018; G06K 7/14; G06Q 20/208
See application file for complete search history.

(56) References Cited

U.S. PATENT DOCUMENTS

| | | |
|---|---|---|
| 5,814,802 A | 9/1998 | Hecht et al. |
| 6,871,993 B2 | 3/2005 | Hecht |
| 8,233,040 B2 | 7/2012 | Patel et al. |
| 8,430,318 B2 | 4/2013 | McQueen et al. |
| 9,004,359 B2 | 4/2015 | Shearin et al. |
| 9,305,198 B2 | 4/2016 | Thompson et al. |
| 9,413,418 B2 | 8/2016 | Bottazzi et al. |
| 9,870,498 B2 | 1/2018 | Reynolds et al. |
| 10,049,247 B2 | 8/2018 | Gao |
| 10,161,742 B2 | 12/2018 | Patel et al. |
| 10,248,896 B2 | 4/2019 | Gao et al. |
| 2002/0097558 A1 | 7/2002 | Stone et al. |
| 2003/0001010 A1 | 1/2003 | Schmidt et al. |
| 2008/0182639 A1 | 7/2008 | Antonopoulos et al. |
| 2010/0139989 A1 | 6/2010 | Atwater et al. |

(Continued)

OTHER PUBLICATIONS

International PCT Patent Application No. PCT/US2022/052882, International Search Report and Written Opinion dated Mar. 8, 2023, 11 pgs.

*Primary Examiner* — Matthew Mikels
(74) *Attorney, Agent, or Firm* — Foley & Lardner LLP (57) ABSTRACT

The disclosure includes a fixed retail scanner including a data reader comprising a main board, one or more camera modules, and a multi-port network switch disposed within the data reader. A heat management system is disposed within the data reader housing and operably coupled with at least the multi-port network switch to dissipate heat therefrom. The disclosure includes a heat pipe thermally coupled to a switch processor, the heat pipe extending across at least a portion of the bi-optic housing to an air chamber formed within the bi-optic housing.

20 Claims, 8 Drawing Sheets

(56) References Cited

U.S. PATENT DOCUMENTS

2014/0118920 A1    5/2014  Ng et al.
2017/0337406 A1*  11/2017  Reynolds ........... G06K 7/10792
2017/0374768 A1  12/2017  Hughes et al.
2018/0301269 A1  10/2018  Sundaram
2020/0125812 A1   4/2020  Canini et al.

\* cited by examiner

FIXED RETAIL SCANNER HEAT MANAGEMENT SYSTEM FOR MULTI-PORT NETWORK SWITCH AND RELATED METHODS

PRIOR APPLICATIONS

This application claims the benefit of U.S. Provisional Application Ser. No. 63/293,565, filed Dec. 23, 2021, and entitled "FIXED RETAIL SCANNER HEAT MANAGEMENT SYSTEM FOR MULTI-PORT NETWORK SWITCH AND RELATED METHODS," the disclosure of which is incorporated by reference herein in its entirety.

RELATED APPLICATION

This application is also related to U.S. patent application Ser. No. 18/081,624, (to be inserted by Amendment), filed on the same day as the present application, which claims priority to U.S. Provisional Application Ser. No. 63/299,901, filed Jan. 14, 2022, and entitled "HEAT MANAGEMENT SYSTEM FOR TOP-DOWN READER OF A FIXED RETAIL SCANNER AND RELATED METHODS," the disclosure of which is incorporated by reference herein in its entirety.

TECHNICAL FIELD

The present disclosure relates generally to scanners or code readers, and more particularly, to providing heat management for fixed retail scanners having a multi-port enabled switch.

BACKGROUND

Data reading devices are used to read optical codes, acquire data, and capture a variety of images. Optical codes typically comprise a pattern of dark elements and light spaces. There are various types of optical codes, including one-dimensional codes, such as a Universal Product Code ("UPC") and EAN/JAN codes, and stacked and two-dimensional codes, such as PDF417 and Maxicode codes. Data reading devices are well known for reading UPC and other types of optical codes on packages, particularly in retail stores. One common data reader in such systems is an imaging reader that employs an imaging device or sensor array, such as a CCD (charge coupled device) or CMOS (complementary metal oxide semiconductor) device. Imaging readers can be configured to read both 1-D and 2-D optical codes, as well as other types of optical codes or symbols and images of other items.

BRIEF SUMMARY

A fixed retail scanner including a data reader, may include a housing of the data reader, a main board including one or more processors disposed within the data reader housing, one or more camera modules disposed within the data reader housing, a multi-port network switch disposed within the data reader housing and operably coupled with the main board, and a heat management system disposed within the data reader housing and operably coupled with at least the multi-port network switch to dissipate heat therefrom.

A fixed retail scanner may include a multi-port network switch disposed within a bi-optic housing, including a multi-port network switch having a switch processor, and a heat pipe thermally coupled to the switch processor, the heat pipe extending across at least a portion of the bi-optic housing to an air chamber formed within the bi-optic housing.

A method for providing heat management of a fixed retail scanner may include (i) drawing heat away from a multi-port network switch having a switch processor via a heat pipe extending across an internal region of a bi-optics housing to an air chamber, and (ii) creating an air flow through the air chamber.

DETAILED DESCRIPTION

The illustrations included herewith are not meant to be actual views of any particular systems, memory device, architecture, or process, but are merely idealized representations that are employed to describe embodiments herein. Elements and features common between figures may retain the same numerical designation except that, for ease of following the description, for the most part, reference numerals begin with the number of the drawing on which the elements are introduced or most fully described. In addition, the elements illustrated in the figures are schematic in nature, and many details regarding the physical layout and construction of a memory array and/or all steps necessary to access data may not be described as they would be understood by those of ordinary skill in the art.

As used herein, the singular forms "a," "an," and "the" are intended to include the plural forms as well, unless the context clearly indicates otherwise.

As used herein, "or" includes any and all combinations of one or more of the associated listed items in both, the conjunctive and disjunctive senses. Any intended descriptions of the "exclusive-or" relationship will be specifically called out.

As used herein, the term "configured" refers to a structural arrangement, such as size, shape, material composition, physical construction, logical construction (e.g., programming, operational parameter setting) or other operative arrangement of at least one structure and at least one apparatus facilitating the operation thereof in a defined way (e.g., to carry out a specific function or set of functions).

As used herein, the phrases "coupled to" or "coupled with" refer to structures operatively connected with each other, such as connected through a direct connection or through an indirect connection (e.g., via another structure or component).

"Image data" as used herein includes both individual frames as well as multiple frames (e.g., streaming video). Image data may be captured by one or more imagers positioned at various within the housing of the fixed retail scanner, such as in a horizontal base unit or a vertical bonnet of a bi-optic scanner having imagers positioned in two different planes. Single plane scanners (e.g., horizontal or vertical only housings) are also contemplated and within the scope of the disclosure. Image data may also be captured by one or more imagers positioned external to the primary scanning unit, such as peripheral devices (e.g., top down reader imagers, security imagers, bottom of basket readers, etc.) that may also provide image data to the fixed retail scanner and/or remote systems.

Figure 1:
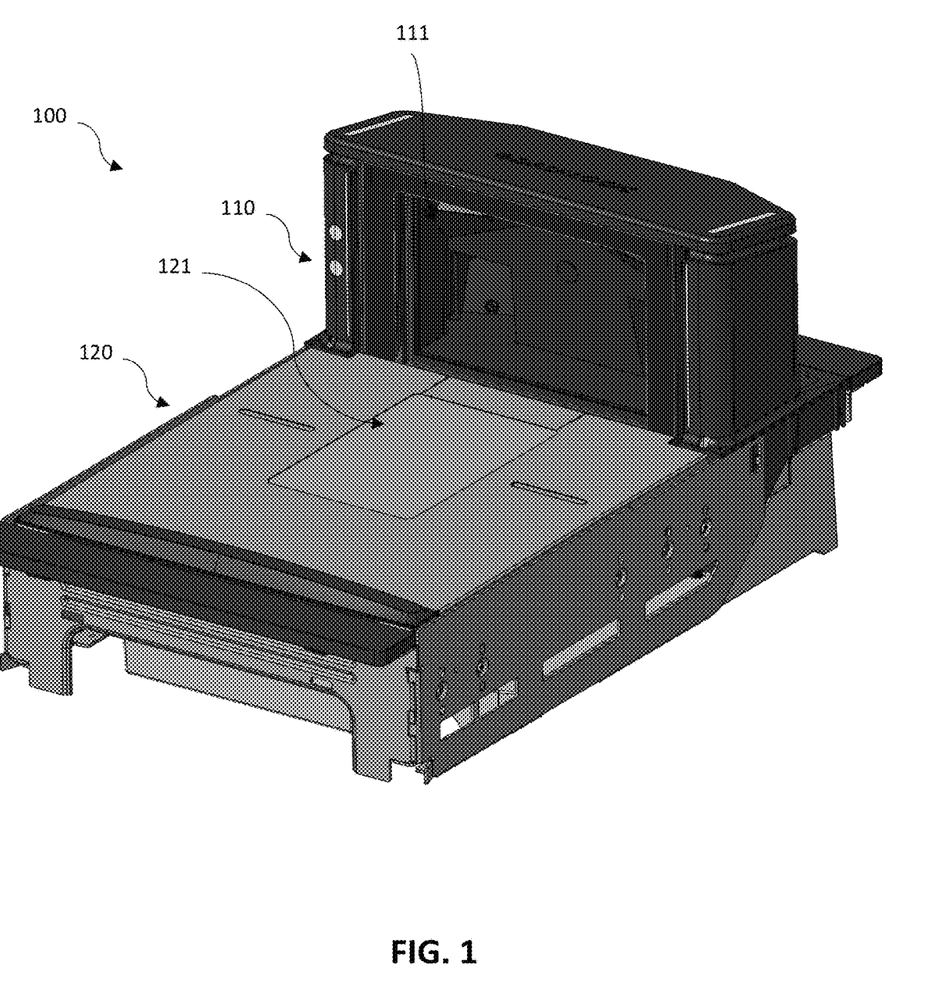
FIG. 1 is a perspective view of a data reader according to an embodiment of the disclosure.

FIG. 1 is a perspective view of a data reader 100 according to an embodiment of the disclosure. The data reader 100 may be a bi-optic fixed retail scanner having a vertical housing 110 and a horizontal housing 120. The vertical housing 110 may include a structure that provides for one or more camera fields-of-view (through a vertical window 111) within a generally vertical plane across the read zone of the data reader 100. The vertical structure provides an enclosure for one or more cameras and other optical elements (e.g., lenses, mirrors, etc.) and electrical elements (e.g., cables, circuit boards, etc.) therein. The horizontal housing 120 may include a structure that provides for one or more camera fields-of-view (through a horizontal window 121) within a generally vertical plane across the read zone of the data reader 100. The horizontal structure provides an enclosure for one or more cameras and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa. It should be understood that higher angled orientations may be utilized if capable of performing the same or similar functionality as described herein. For example, if a higher relative angle exists, the optics may be configured and oriented to perform the same or similar functionality for scanning and the vertical housing 110 may be configured to support items placed in the same or similar manner on the horizontal housing 120 and supported by the vertical housing 110 albeit having a higher angular orientation.

Figure 2:
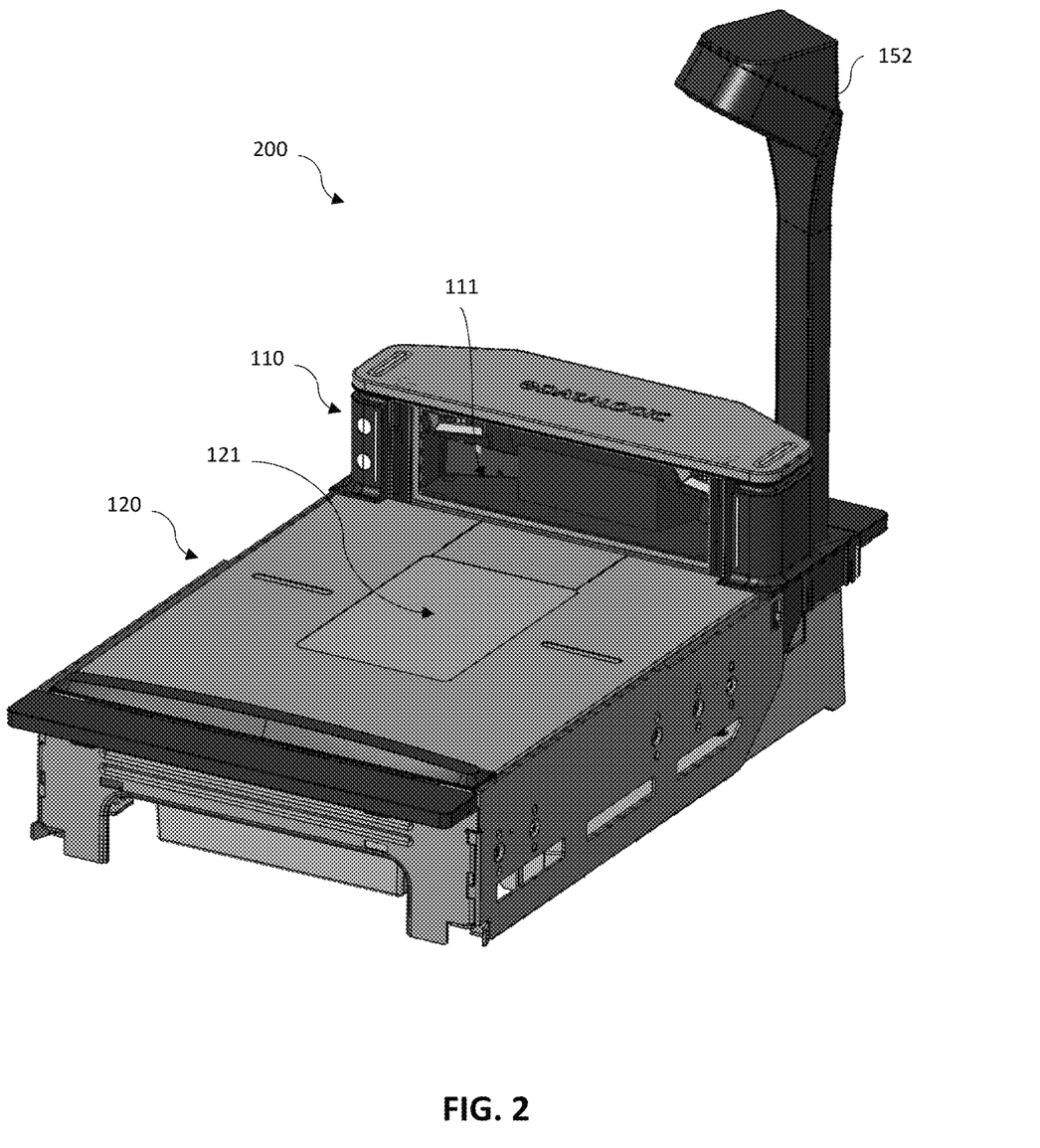
FIG. 2 is a perspective view of a data reader according to an embodiment of the disclosure.

FIG. 2 is a perspective view of a data reader 200 according to an embodiment of the disclosure. As with the data reader of FIG. 1, the data reader of FIG. 2 may also be a bi-optic fixed retail scanner having a vertical housing 110 and a horizontal housing 120. The data reader 200 may also include a top-down reader (TDR) 152 that includes a stand connected to the data reader 100 with a head that includes one or more imagers therein. Such imager(s) typically provide a generally close overhead (angled) view of the read zone to provide a top view of a product whereas internal cameras may be better suited for capturing images of the bottom and/or sides of the object within the read zone.

The vertical housing of FIG. 2 may have a lower profile bonnet compared to that of FIG. 1, which may result in internal cameras having a lower incidence angle. Thus, such a form factor may be particularly well suited to include the TDR 152 as an optional add-on to the data reader 200. However, a TDR 152 may also be coupled to the data reader 100 of FIG. 1 having the taller bonnet. Such a TDR 152 may need to be taller to accommodate the taller bonnet. In addition, some embodiments may include additional TDRs, such as on the other side of the bonnet to provide another top view of the read zone. Thus, some embodiments may include one or more TDRs for data readers having different sized bonnets. It is also recognized that some embodiments may include single plane data readers such that certain features described herein are wholly located within a single plane housing (e.g., horizontal), which may further be coupled to other external devices or peripherals.

Different configurations and details regarding the construction and components of a fixed retail scanner are contemplated. For example, additional features and configurations of devices are described in the following patents and patent applications: U.S. Pat. No. 8,430,318, issued Apr. 30, 2013, and entitled "SYSTEM AND METHOD FOR DATA READING WITH LOW PROFILE ARRANGEMENT," U.S. Pat. No. 9,004,359, issued April 14, 2015, entitled "OPTICAL SCANNER WITH TOP DOWN READER," U.S. Pat. No. 9,305,198, issued Apr. 5, 2016, entitled "IMAGING READER WITH IMPROVED ILLUMINATION," U.S. Pat. No. 10,049,247, issued Aug. 14, 2018, entitled "OPTIMIZATION OF IMAGE FRAME MANAGEMENT IN A SWEEP-STYLE OPTICAL CODE DATA READE," U.S. Pat. No. 10,248,896, issued Apr. 2, 2019, and entitled "DISTRIBUTED CAMERA MODULES SERIALLY COUPLED TO COMMON PREPROCESSING RESOURCES FACILITATING CONFIGURABLE OPTICAL CODE READER PLATFORM FOR APPLICATION-SPECIFIC SCALABILITY," and U.S. Patent Application Publication No. 2020/0125812, filed Dec. 2, 2019, and entitled "DATA COLLECTION SYSTEMS AND METHODS TO CAPTURE IMAGERS OF AND DECODE INFORMATION FROM MACHINE-READABLE SYMBOLS," the disclosure of each of which is incorporated by reference in their entirety. Such fixed retail scanners may be incorporated within assisted checkout stations having a clerk assisting a customer, while some embodiments include self-checkout stations in which the customer is the primary operator of the device. Such components and features may be employed in combination with those described herein.

Figure 3:
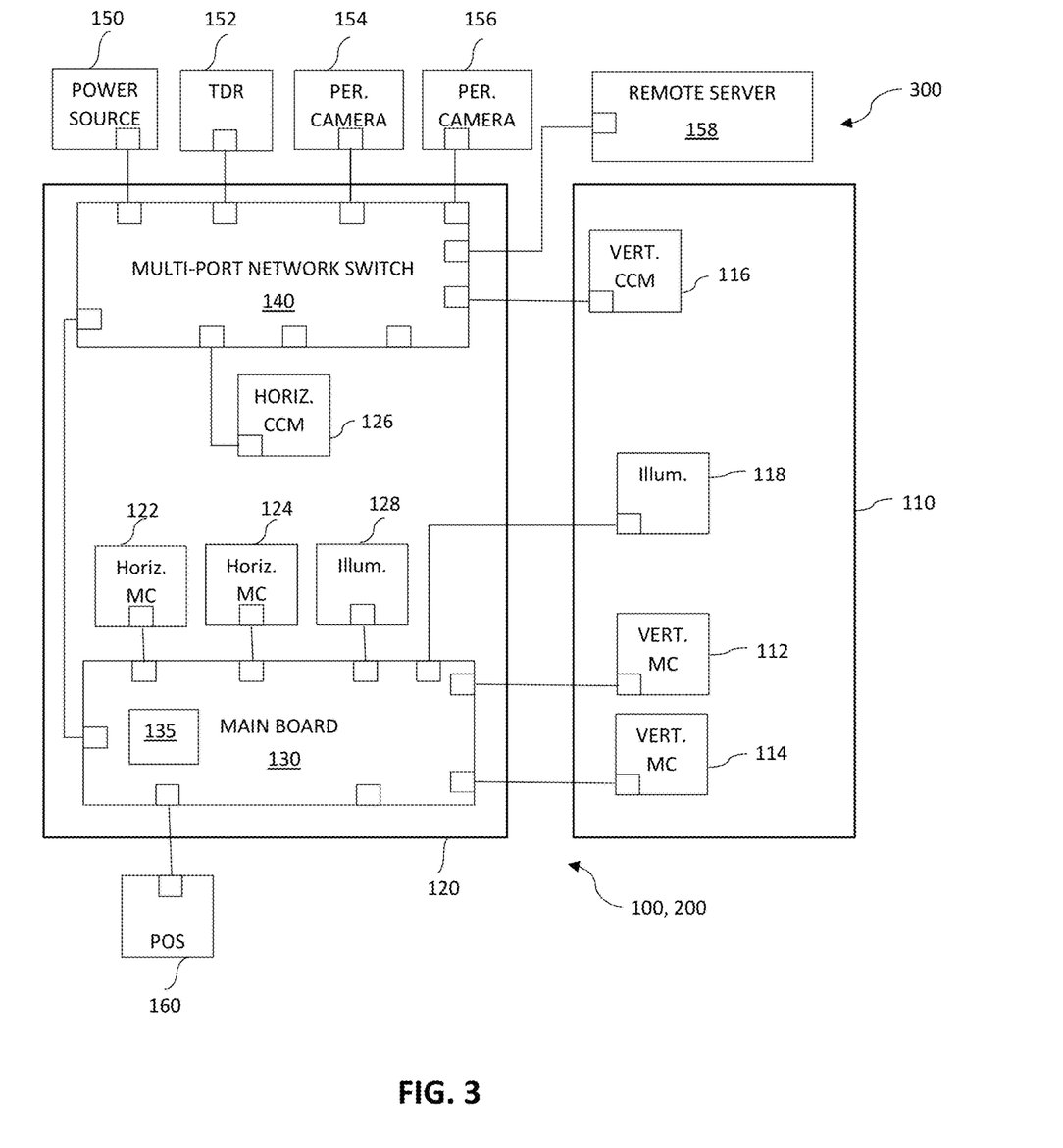
FIG. 3 is a simplified block diagram of a data reading system according to an embodiment of the disclosure.

FIG. 3 is a simplified block diagram of a data reading system 300 according to an embodiment of the disclosure. The data reading system 300 may include a data reader 100, 200 of FIGS. 1 and 2 that may be operably coupled with one or more of a power source 150, the top-down reader (TDR) 152, peripheral cameras 154, 156, a remote service 158, or a point of sale (POS) system 160.

The data reader 100, 200 may be a bi-optic fixed retail scanner having a vertical housing 110 and a horizontal housing 120. The data reader 100, 200 may be installed in a retail environment (e.g., grocery store), which typically is disposed within a counter or other support structure of an assisted checkout lane or a self-checkout lane. The vertical housing 110 may include a structure that provides for one or more camera fields-of-view (through a vertical window) within a generally vertical plane across the read zone of the data reader 100, 200. The vertical structure provides an enclosure for one or more cameras 112, 114, 116, active illumination elements 118 (e.g., LED assemblies), and other optical elements (e.g., lenses, mirrors, etc.) and electrical elements (e.g., cables, circuit boards, etc.) therein. The horizontal housing 120 may include a structure that provides for one or more camera fields-of-view (through a horizontal window) within a generally vertical plane across the read zone of the data reader 100, 200. The horizontal structure 120 provides an enclosure for one or more cameras 122, 124, 126, active illumination elements 128 (e.g., LED assemblies), and other optical elements (e.g., lenses, mirrors, etc.) and electrical elements (e.g., cables, circuit boards, etc.) therein. Thus, the vertical housing 110 and the horizontal housing 120 may be generally orthogonal to each other (including slightly angled orientations, such as being in the range of ±10° from orthogonal). Depending on the arrangement and orientation of the different opto-electrical elements, certain elements related to providing a horizontal field-of-view may be physically located within the vertical structure and vice versa.

The data reader 100, 200 may include one or more different types of imagers, such as monochrome imagers and/or color imagers. For example, vertical monochrome cameras 112, 114 may be configured to capture monochrome images through the vertical window of the data reader 100, 200. Likewise, horizontal monochrome cameras 122, 124 may be configured to capture monochrome images through the horizontal window of the data reader 100, 200. Vertical color camera module (CCM) 116 may be configured to capture color images through the vertical window of the data reader 100, 200. Likewise, horizontal color camera module (CCM) 126 may be configured to capture color images through the horizontal window of the data reader 100, 200. Monochrome images may be analyzed (e.g., by a decoder) to decode one or more indicia (e.g., 1D barcodes, 2D barcodes, optical character recognition, digital watermarks, etc.). Color images may be analyzed (e.g., by an image processor) to perform analysis on the images where color information may be particularly useful in performing certain functions, such as produce recognition, item recognition or verification, and/or security analysis. Such analysis may be performed by local and/or remote processors that may contain an artificial intelligence (AI) engine or otherwise configured to perform other machine learning techniques.

The data reader may further include a main board 130 and a multi-port network switch 140. As shown herein, the main board 130 and the multi-port network switch 140 may be physically housed within the horizontal housing 120. Bi-optic readers tend to have larger horizontal housings in order to provide support for the device within a cavity in a counter, which also provides space for a scale (not shown) used to weigh produce or other items sold by weight or otherwise perform weighing of items when placed on the horizontal surface (often called a "weigh platter"). It is contemplated that some embodiments may include the main board 130 and/or the multi-port network switch 140 to be physically located within the vertical housing 110. In such an embodiment where one of the multi-port network switch 140 or the main board 130 is physically located within the vertical housing 110 and the other is physically located within the horizontal housing 120, the two boards may be generally oriented orthogonal to each other similar to the orientation of the windows or other angled arrangements (including slightly angled orientations, such as being in the range of ±10° from orthogonal). The ports may be at least somewhat aligned in the orthogonal direction or other arrangement to accommodate easy connection of network cables therebetween.

The main board 130 may be operably coupled (e.g., capable of communicating signals with one another) with the vertical monochrome imagers 112, 114 and the horizontal monochrome imagers 122, 124. These connections may be via a communication interface (e.g., a MIPI interface). The main board 130 may have decoding software embedded therein such that one or more on-board processors 135 may receive monochrome images to perform decoding on the optical indicia and provide the decoding result to a point of sale (POS) system 160 operably coupled thereto to complete a transaction. The one or more on-board processors 135 may also be configured to provide control (e.g., coordination or synchronization) of the various components of the system including camera exposure and timing of active illumination assemblies 118, 128 of the system. Although a single block is shown representing one or more on-board processors 135, it is contemplated that some embodiments may include multiple processing components (e.g., microprocessors, microcontrollers, FPGAs, etc.) configured to perform different tasks, alone or in combination, including object detection, system control, barcode decoding, optical character recognition, artificial intelligence, machine learning analysis, or other similar processing techniques for analyzing the images for product identification or verification or other desired events. Thus, different processing elements are contemplated among the one or more processors 135, such as for example, a system processor (e.g., general processing unit) and one or more image processors (e.g., digital signal processor), and/or an artificial intelligence (AI) accelerator disposed on the main board 130 and coupled to the system processor (e.g., via insertion into a PCIe slot on the main board 130).

The multi-port network switch 140 may be operably coupled to vertical CCM 116 and horizontal CCM 126 located within the data reader 100, 200. The multi-port network switch 140 may also be operably coupled with main board 130 located within the data reader 100, 200. Multi-port network switch 140 may also be operably coupled to the power source 150 as well as peripheral devices, such as the TDR 152, peripheral cameras 154, 156, and/or the remote server 158. The number, and types of peripheral devices, may depend on a desired application within a retail environment. The TDR 152 may be configured as a stand connected to the data reader 100, 200 that typically provides a generally close overhead (angled) view of the read zone to provide a top view of a product whereas internal cameras 112, 114, 116, 122, 124, 126 may be better suited for capturing images of the bottom and/or sides of the object within the read zone. Peripheral cameras 154, 156 may be located remotely from the data reader 100, 200, such as being mounted on a ceiling or wall of the retail environment to provide additional views of the read zone or checkout area. Such views may be useful for security analysis of the checkout area, such as product verification, object flow, human movements, etc. Such analysis may be performed by a remote service or other local devices (e.g., located on or otherwise coupled to the main board 130 or multi-port network switch 140). Other peripheral devices may be located near the data reader 100, 200, such as a peripheral presentation scanner resting or mounted to a nearby surface, and/or a handheld scanner that also may be used for manual capturing by the user (e.g., checkout assistant or self-checkout customer). Such devices may be coupled directly to the main board 130 in some embodiments or to the multi-port network switch 140 if so enabled. As shown, the POS 160 may be coupled directly to the main board 130. Such a connection may be via communication interfaces, such as USB, RS-232, or other such interfaces. In some embodiments, the POS 160 may be coupled directly to the multi-port network switch 140 if so enabled (e.g., as an Ethernet connected device).

The multi-port network switch 140 may be implemented on a separate board from the main board 130. In some embodiments, the multi-port network switch 140 may be implemented on the main board 130 that also supports the one or more processors 135 also described herein. The multi-port network switch may include a plurality of ports to provide advanced network connectivity (e.g., Ethernet) between internal devices (e.g., CCMs 116, 126) within the data reader 100, 200 and external devices (e.g., TDR 152, peripheral camera(s) 154, 156, remote server 158, etc.) from the data reader 100, 200. Thus, the multi-port network switch 140 may provide an Ethernet backbone for the elements within the data reader 100, 200 as well as for external devices coupled to the data reader 100, 200 for control and/or managing data flow or analysis. As an example, multi-port network switch 140 may be implemented with a KSZ9567 Ethernet switch or other EtherSynch® product family member available from Microchip Technology Inc of Chandler, Ariz. or other similar products configured to provide network synchronization and communication with network-enabled devices. Embodiments of the disclosure may include any number of ports supported by the multi-port network switch to couple to both internal devices (e.g., main board, cameras, etc.) and external devices (e.g., peripheral cameras, TDR, illumination sources, remote servers, etc.) to provide a flexible platform to add additional features for connecting with the data reader 100, 200.

Although FIG. 3 shows one block for active illumination assemblies 118, 128 in each of the vertical and horizontal housings 110, 120, some embodiments may include multiple such assemblies in each of the horizontal and vertical housings 110, 120 in order to provide for different lighting options at different angles across the read zone. For example, the vertical housing 110 may include two (or more) illumination assemblies therein at different locations and/or different colors for a desired illumination field from the vertical view. Likewise, the horizontal housing 120 may include two (or more) illumination assemblies therein at different locations and/or different colors for a desired illumination field from the horizontal view. As shown herein, the illumination assemblies 118, 128 may be coupled directly to the main board 130. However, in some embodiments, additional components may be coupled within the path from the main board 130, such as a control panel or other such device. In yet other embodiments, the illumination assemblies 118, 128 may be coupled to the multi-port network switch 140, which may route triggering controls from the main board 130. TDR 152 and one or more of the peripheral cameras 154, 156 may also include associated illumination assemblies. Synchronization of such illumination sources may be managed by the multi-port network switch 140 as controlled by the main board 130. In some embodiments, the multi-port network switch may employ or leverage IEEE1588 Precision Time Protocol to synchronize the illumination system with remote cameras, which may enable clock accuracy in sub-microsecond range.

In operation, images may be captured by the cameras 112, 114, 116, 122, 124, 126. Monochrome images may be captured by monochrome cameras 112, 114, 122, 124 and color images may be captured by color cameras 116, 126. The multi-port network switch 140 may be configured to coordinate (e.g., synchronize) timing of camera exposure and active illumination (e.g., white illumination) with the color cameras 116, 126 (as controlled by the controller on the main board 130) to occur in an offset manner with the timing of the camera exposure and active illumination (e.g., red illumination) with the monochrome cameras 112, 114, 122, 124.

Image data (e.g., streaming video, image frames, etc.) from the color cameras 116, 126 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the color images internally within the data reader 100, 200 by the one or more processors 135 supported by the main board 130. In some embodiments, barcode decoding may also be performed on the color images internally within the data reader 100, 200 by the one or more processors 135 supported by the main board 130. Image data from the color cameras 116, 126 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the color images externally to the data reader 100, 200 by external devices coupled through the multi-port network switch 140. Such color images or other data stream may be routed directly to the network connected external devices through the multi-port network switch 140 without first being received by the main board 130 (if at all). In other words, image data may be communicated (e.g., passed) from at least one imager internal to the data reader through the at least one multi-port network device 140 and on to at least one external device bypassing the main board 130. Having a connection to both the main board 130 as well as to external devices via the multi-port network switch enables image data to be provided to internal as well as external processing resources.

Image data from the monochrome cameras 112, 114, 122, 124 may be provided to the main board 130 to the processing/analysis modules located internal to the data reader 100, 200, such as the one or more processors 135 supported by the main board 130. As such, barcode decoding may also be performed on the color images internally within the data reader 100, 200 by the one or more processors 135 supported by the main board 130. In some embodiments, image analysis (e.g., AI, machine learning, OCR, object recognition, item validation, produce recognition, analytics, etc.) may be performed on the monochrome images internally within the data reader 100, 200 by the one or more processors 135 supported by the main board 130. Image data from the monochrome cameras 112, 114, 122, 124 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on the monochrome images externally to the data reader 100, 200 by external devices coupled through the multi-port network switch 140. Such monochrome images or other data stream may be routed directly to the network connected external devices to the multi-port network switch 140 after first being received by the main board 130.

Image data (e.g., streaming video, image frames, etc.) from the TDR 152 or other external peripheral cameras 154, 156 may be routed through the multi-port network switch 140 to the processing/analysis modules located internal to the data reader 100, 200, such as the one or more processors 135 supported by the main board 130. As such, image analysis (e.g., AI, machine learning, OCR, object recognition, item validation, produce recognition, analytics, etc.) may be performed on the images (e.g., color and/or monochrome) internally within the data reader 100, 200 by the one or more processors 135 supported by the main board 130. In some embodiments, barcode decoding may also be performed on such images internally within the data reader 100, 200 by the one or more processors 135 supported by the main board 130. Image data from the TDR 152 or other external peripheral cameras 154, 156 may also be routed through the multi-port network switch 140 to external devices, such as remote server 158 or other similar devices including any network enabled POS systems. As such, image analysis (e.g., AI, machine learning, OCR, object recognition, item validation, produce recognition, analytics, etc.) may be performed on these images externally to the data reader 100, 200 by external devices coupled through the multi-port network switch 140. Such images or other data stream may be routed directly to the network connected external devices through the multi-port network switch 140 without first being received by the main board 130 (if at all).

The multi-port network switch 140 may be coupled to the main board 130 via a single cable configured to provide power and communication to the main board 130. Power may be provided to the system via power source 150 via the multi-port network switch 140, which in turn provides power (e.g., power over Ethernet (PoE)) to the main board 130 and the color cameras 116, 126. Monochrome cameras 112, 114, 122, 124 and illumination assemblies 118, 128 may be powered via the main board 130.

Advantages of employing the multi-port network switch as a primary backbone for communication and power to interface between both internal and external components of the system include enabling power, communications, and camera/illumination synchronization to occur over a single cable between such connected components. In addition, precision time protocol (PTP), generic precision time protocol (GPTP), time sensitive networking (TSN) may provide an improved synchronization (e.g., within 1 microsecond error) for an open standard, widely supported, single cable solution. In addition, scanner maintenance tools may be simplified via improved network connectivity.

Figure 4:
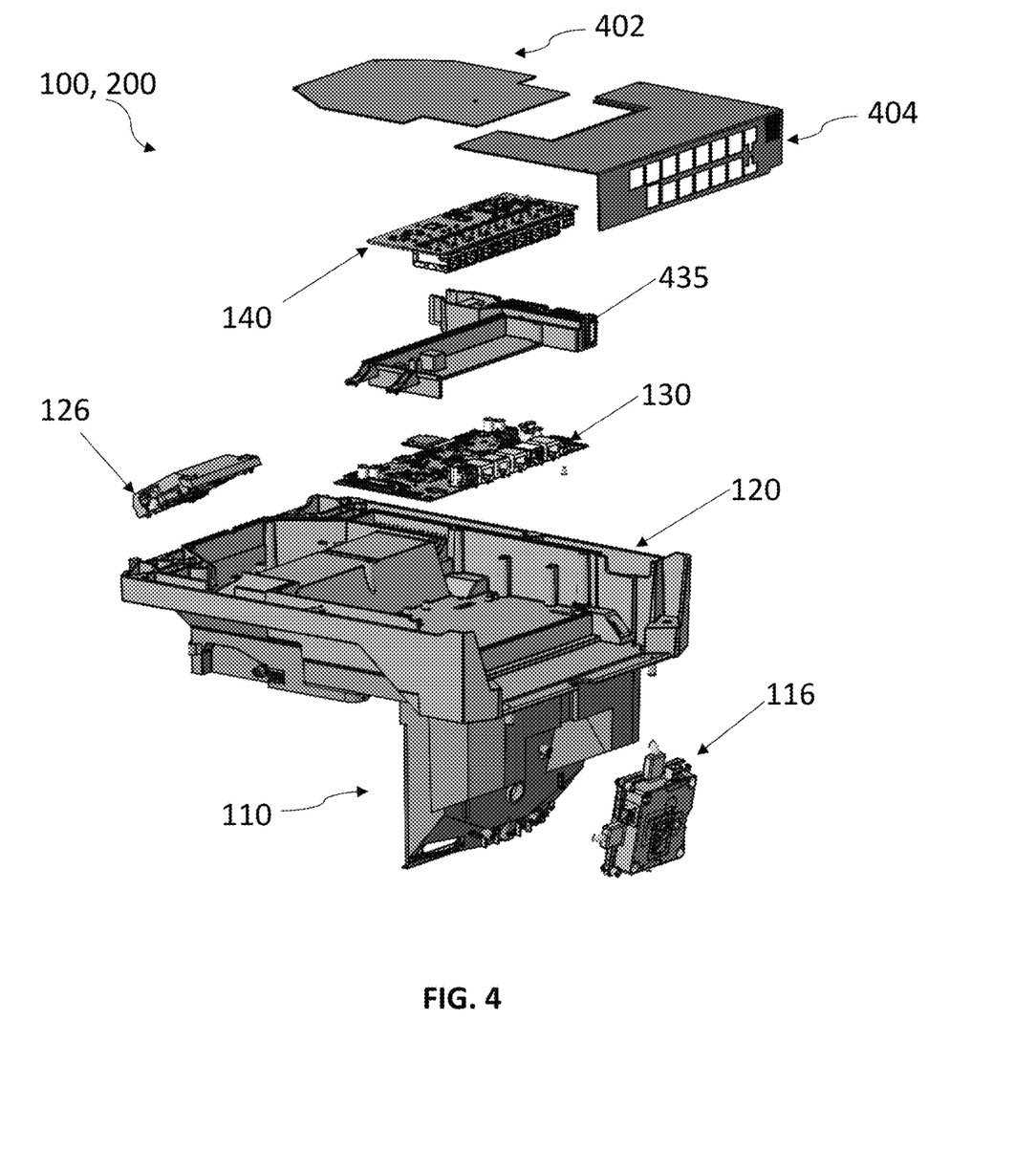
FIG. 4 is an exploded view of the data reader according to an embodiment of the disclosure having outer covers of the horizontal housing and vertical housing removed.

FIG. 4 is an exploded view of the data reader 100 according to an embodiment of the disclosure having outer covers of the horizontal housing 120 and vertical housing 110 removed. The data reader 100 is flipped in an upside-down orientation to better focus on the arrangements of the components within the horizontal housing 120. It should be noted that some components (e.g., monochrome cameras, LED illumination, etc.) are not shown for simplification of the view. The main board 130 may be disposed and mounted (e.g., via screws) within a void (i.e., cavity) within the lower chassis of the horizontal 120. The multi-port network switch 140 may be disposed within the void as well in a stacked arrangement between a surface of the lower chassis of the horizontal housing 120 and outer cover(s) 402, 404. Although the main board 130 is shown as being secured to rest against the lower chassis of the horizontal housing 120 with the multi-port network switch 140 secured on top of the main board 130, some embodiments may include the multi-port network switch 140 secured to rest against the lower chassis of the horizontal housing 120 with the main board 130 secured on top of the multi-port network switch 140. The horizontal housing 120, vertical housing 110, and cover 402, 404 may collectively form a housing (data reader housing) of the data reader 100. Other features may also be part of the data reader housing.

The void wherein the main board 130 and the multi-port network switch 140 are located may be positioned proximate the back of the lower chassis of the horizontal housing 120 as shown in FIG. 4. A separate void (i.e., cavity) may be located proximate the front of the lower chassis of the horizontal housing 120, where the horizontal CCM may be disposed and secured to be pointed toward the window to capture images.

In some embodiments, a heatsink 435 may be disposed in the stacked arrangement of the main board 130 and the multi-port network switch 140, such as being located between the main board 130 and the multi-port network switch 140. The heatsink 435 may also provide support for the multi-port network switch 140 and the main board 130 to be secured to each other in the stacked arrangement. Thus, the heatsink 435 may be a single structure mounted directly to one or both of the multi-port network switch 140 or the main board 130. It should be understood that the heatsink 435 may be formed of multiple pieces that connect to one another, as well.

The heatsink 435 may be thermally coupled with the multi-port network switch 140 and the data reader housing, such as the lower chassis (i.e., frame) of the horizontal housing 120. The heatsink 435 may provide contacts to components (e.g., processor chip(s)) on the multi-port network switch 140 to provide heat dissipation to the lower chassis of the horizontal housing 120 generated by the multi-port network switch 140. In some embodiments, the heatsink 435 may provide contacts to components (e.g., processor chip(s)) on the main board 130 to provide heat dissipation to the lower chassis of the horizontal housing 120 generated by the main board 130. In some embodiments, the heatsink 435 may provide contacts to components (e.g., processor chip(s)) on both the main board 130 and the multi-port network switch 140 to provide heat dissipation to the lower chassis of the horizontal housing 120 generated by both the main board 130 and the multi-port network switch 140. Thus, a first side of the heat sink 435 may contact components on the multi-port network switch 140, and a second side of the heat sink 435 may contact components on the main board 130 to provide shared heat management of both boards within the stacked arrangement to dissipate heat to the lower chassis of the horizontal housing 120.

Some embodiments of the disclosure may include the heatsink 435 not being located between the multi-port network switch 140 and the main board 130. For example, the heatsink 435 may be located on top of the stacked arrangement coupling to the multi-port network switch 140 only. In this arrangement, components of the multi-port network switch 140 may point away from the main board 130 with the top of the stack having the heat sink 435 mounted thereon to provide contact points with the components of the heat generating components of the multi-port network switch 140.

In some embodiments, the heatsink 435 may include a metal structure that couples with the lower chassis of the horizontal housing 120 to draw and disperse the heat. In such embodiments, the lower chassis may also be formed from metal. Some embodiments may also include a fan (not shown) to create airflow across the heatsink to provide additional heat dissipation.

Figure 5:
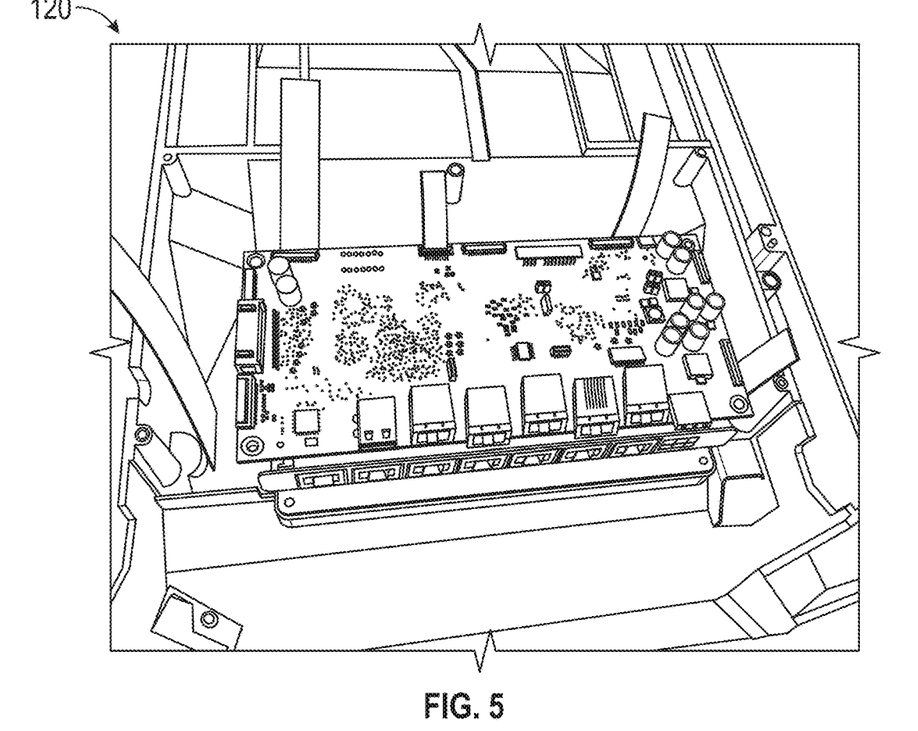
FIGS. 5 and 6 are images showing an example of the main board and the multi-port network switch secured to the horizontal housing in a stacked arrangement with the covers removed and with a cover secured in place of the stacked arrangement.
Figure 6:
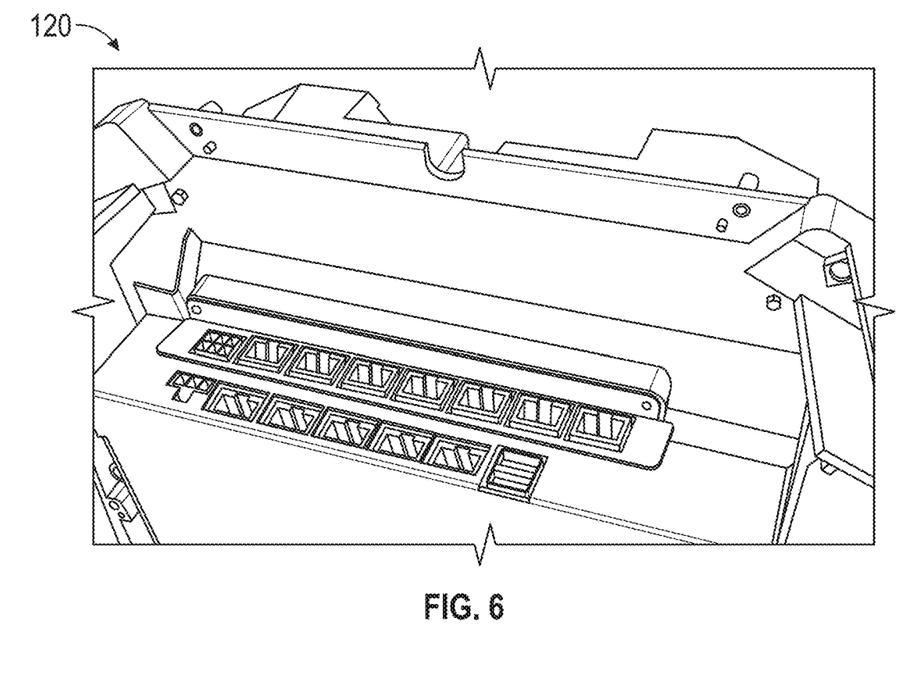

FIGS. 5 and 6 are images showing an example of the main board and the multi-port network switch secured to the horizontal housing in a stacked arrangement with the covers removed (FIG. 5) and with a cover secured in place of the stacked arrangement (FIG. 6). The stacked arrangement in FIGS. 5 and 6 shows the multi-port network switch on the bottom of the stack with the main board being on the top of the stack in contrast to the arrangement shown in FIG. 4 with the multi-port network switch on the top of the stack with the main board being on the bottom of the stack when disposed and mounted within the lower chassis of the horizontal housing. In either embodiment, a heatsink may be employed to provide heat management to one or both of the multi-port network switch or the main board.

Figure 7:
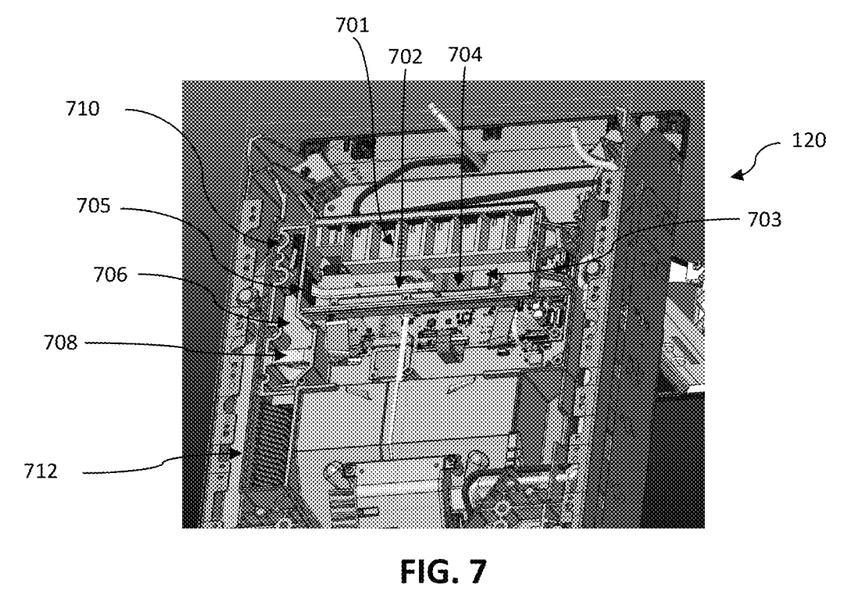
FIG. 7 is a perspective view of the underside of the horizontal housing of the data reader according to another embodiment of the disclosure.
Figure 8:
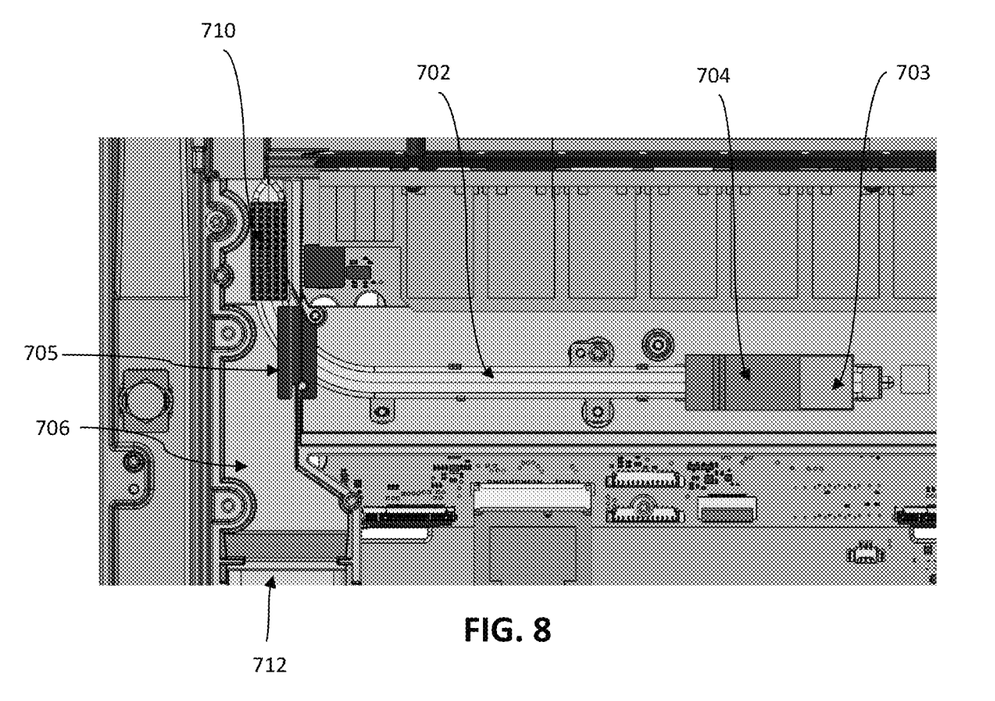
FIG. 8 is a zoomed-in view isolating the features of the heat pipe and air cavity described below.
Figure 9:
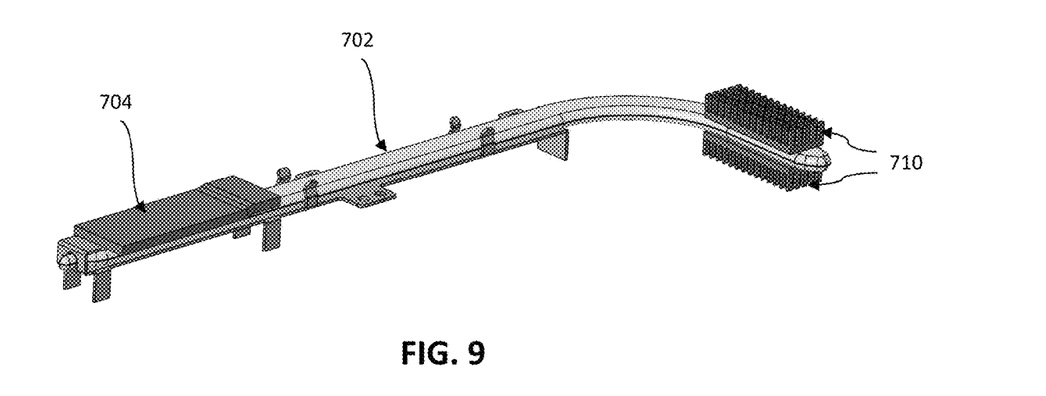
FIG. 9 is an isolated view of the heat pipe structure described below.

FIGS. 7-10 show different views of the heat management system according to another embodiment of the disclosure. FIG. 7 is a perspective view of the underside of the horizontal housing 120 of the data reader according to another embodiment of the disclosure. FIG. 8 is a zoomed-in view isolating the features of the heat pipe 702 and air chamber 706 described below. FIG. 9 is an isolated view of the heat pipe structure described below. In these views, certain components have been removed for clarity of discussing another embodiment of a heat management system within the horizontal housing 120. In this view, the covers and the multi-port network switch is removed from the stacked arrangement leaving exposed the intermediary mounting structure 701 between the main board (not shown—located below the intermediary mounting structure 701). The intermediary mounting structure 701 includes slots for receiving the port connectors when the multi-port network switch 140 is inserted face down for being secured to the structure 701.

Also located within the framework of the structure is a heat pipe 702 thermally coupled with a heat generating component (e.g., a switch processor) mounted on the multi-port network switch and extending across an area within the data reader housing to an air chamber 706. The heat pipe 702 may be an elongate heat transfer device having heat conductivity of at least 500 W/m-K, which is greater than solid metals conventionally used in heat sink applications (e.g., copper (390 W/m-K) or aluminum (200 W/m-K)). In some embodiments, the heat conductivity may range from 1,500 to 50,000 or up to 100,000 W/m-K. Some applications may have higher ranges. Heat pipes typically employ a phase transition (e.g., liquid to vapor) within the heat pipe to transfer heat from an evaporator region to a condenser region. Some heat pipes may include a plurality of smaller heat pipes running in parallel.

The air chamber 706 may be located on a side region within the horizontal housing 120. A first end of the heat pipe 702 may be coupled to a thermal pad 703 via an evaporator 704 to provide a heat conductive connection to the switch processor of the multi-port network switch 140. The evaporator 704 may include a heat plate formed from a metal material (e.g., copper, aluminum, etc.) The heat pipe 702 pass through a side wall of the air chamber 702 to draw heat away from the processor of the multi-port network switch 140 to the air chamber 706. The air chamber 706 may be a defined area (void) having walls that separate the space from other components located within the horizontal housing 120. An airflow seal 705 may be disposed at the interface between the air chamber 706 and the region where the multi-port network switch 140 is located in order to contain the airflow within the air chamber 706 where the heat has been drawn away from the multi-port network switch 140 (and/or main board 130). As a result, dust and other external contaminants may be kept outside of the region of the original heat generating source. The airflow seal 705 may be a rubber material (e.g., a rubber gasket). A second end of the heat pipe 702 may be coupled (e.g., soldered) to a heat exchanger 710 at the condenser end of the heat pipe 702. The heat exchanger 710 may formed from a heat conductive material (e.g., copper, aluminum, etc.) which may also include fins to provide additional heat sink capability. In some embodiments, the heat exchanger 710 may include multiple sets of fins coupled to the heat pipe 702 (as shown in FIG. 9). In order to accommodate the heat exchanger 710, the heat pipe may be shaped (e.g., bent) after entering the air chamber 706.

In some embodiments, a fan 708 may be disposed on a first end of the air chamber 706 and the heat exchanger 710 may be disposed on a second end of the air chamber 706 with the insertion point (where the airflow seal 705 is located) of the heat pipe 702 into the air chamber 706 being located therebetween. The fan 708 draws air from air vents formed in the side wall of the lower chassis of the horizontal housing 120 to create an air flow through the air chamber 706 to the heat exchanger 710 to be expelled out the back of the horizontal housing 120. As a result, the airflow may cool the connected heat generating component (e.g., switch processor) from within a sealed compartment rather than where the component resides within the scanner housing. The fan 708 may include a temperature regulator to determine when to operate as needed rather than running continuously. In some operational situations, the dissipation properties of the heat pipe 702 into the air chamber 706 may be sufficient without operation of the fan 708.

By employing the heat pipe 702 structure, using the heat pipe 702 may be thermally insulated from the frame of the lower chassis and using the frame for heat dissipation may not be required. As a result, external surfaces of the scanner housing may be cooler and closer to ambient temperatures. In addition, the heat sink function may be separated from the mount in contrast to the heatsink of FIG. 4. In other words, by using the heat pipe 702 structure the mounting structure 701 may not be required to be used for heat dissipation. As a result, the lower chassis of the horizontal housing 120 may be formed of a plastic material. Likewise, the mounting structure 701 for the multi-port network switch may also be formed of a plastic material.

The position and orientation of the air chamber 706, air vents 712, fan 708, and/or heat exchanger 710 may be changed to other arrangements depending on the layout of the horizontal housing 120. Thus, air flow may occur from back to front, back to side, side to front, side to side, or other arrangements. The heat pipe 702 may be routed accordingly to connect to the side wall of the air chamber 706. In some embodiments, one or more additional heat pipes may connect to the air chamber or additional air chambers within the horizontal housing 120 depending on the number of heat generating components desired for heat management.

Figure 10:
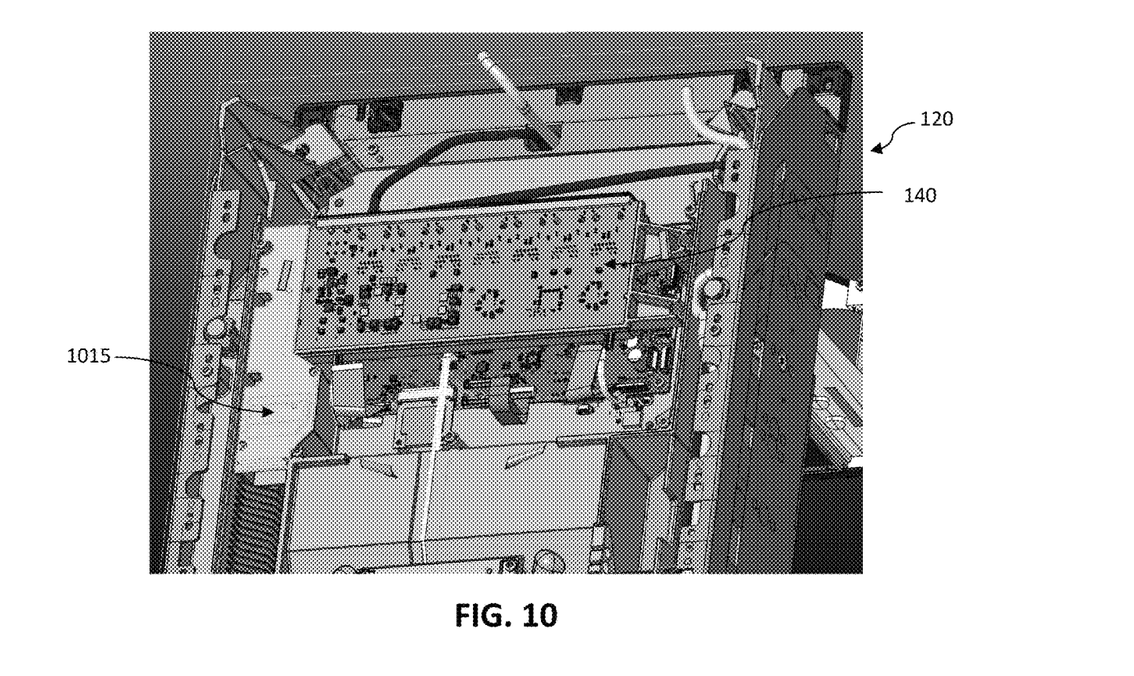
FIG. 10 shows the underside of the horizontal housing of FIG. 7 with the multi-port network switch inserted and secured to the mounting structure in the stacked arrangement.

FIG. 10 shows the underside of the horizontal housing 120 of FIG. 7 with the multi-port network switch 140 inserted and secured to the mounting structure in the stacked arrangement. The processor or other heat generating element(s) may contact the thermal pad(s) to establish a heat conductive connection to the heat pipe disposed therein. A cover 1015 may also be secured over the air chamber to enclose the air chamber and separate the air flow from the other areas within the horizontal housing 120—particularly from the optical cavity where cameras, lenses, and illumination sources may be located.

Figure 11:
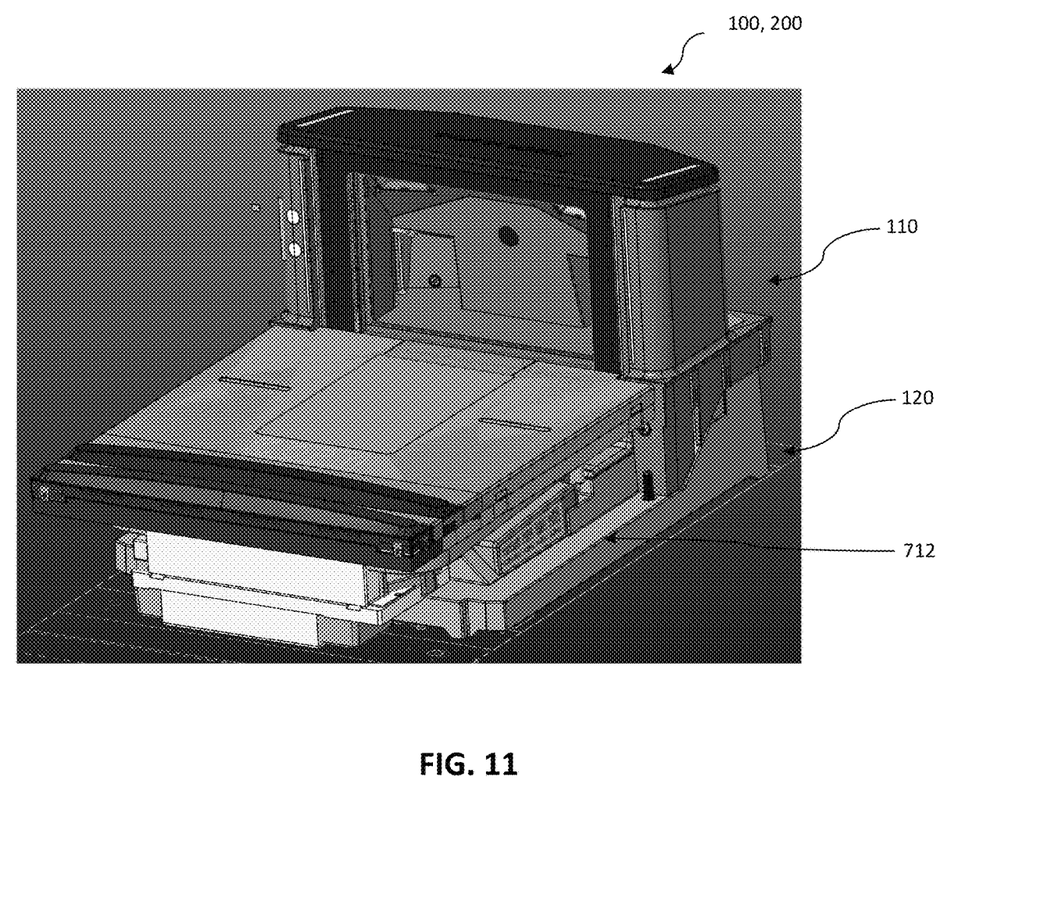
FIG. 11 shows a perspective view of the bi-optic scanner showing the intake air vents on the side of the lower chassis proximate the front end of the scanner according to an embodiment of the disclosure.

FIG. 11 shows a perspective view of the bi-optic scanner 100, 200 showing the intake air vents 712 on the side of the lower chassis proximate the front end of the scanner to draw airflow from a generally forward position to a generally backward position away from the operator. As described above, the location, sizes, and shapes of the air vents 712 may vary for different desired layouts and airflow options.

The foregoing method descriptions and/or any process flow diagrams are provided merely as illustrative examples and are not intended to require or imply that the steps of the various embodiments must be performed in the order presented. As will be appreciated by one of skill in the art, the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations may be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to and/or in communication with another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the disclosure. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The previous description is of various preferred embodiments for implementing the disclosure, and the scope of the invention should not necessarily be limited by this description. The scope of the present invention is instead defined by the claims.

What is claimed:

1. A fixed retail scanner including a data reader, comprising:
    a housing of the data reader;
    a main board including one or more processors disposed within the data reader housing;
    one or more camera modules disposed within the data reader housing;
    a multi-port network switch disposed within the data reader housing and operably coupled with the main board; and
    a heat management system disposed within the data reader housing and operably coupled with at least the multi-port network switch to dissipate heat therefrom, wherein the heat management system includes:
        a heat pipe thermally coupled with a switch processor mounted on the multi-port network switch and extending to an air chamber within the data reader housing;
        a thermal pad coupled to a first end of the heat pipe via an evaporator; and
        a condenser coupling a second end of the heat pipe to a wall of the air chamber.

2. The fixed retail scanner of claim 1, wherein the main board and the multi-port network switch are arranged in a stacked arrangement within the data reader housing.

3. The fixed retail scanner of claim 2, wherein the main board and the multi-port network switch are arranged in the stacked arrangement within a horizontal housing of the data reader housing.

4. The fixed retail scanner of claim 3, wherein the heat management system includes a heatsink having a first contact point with a switch processor mounted on the multi-port network switch and a second contact point with a frame of the horizontal housing.

5. The fixed retail scanner of claim 4, wherein the heatsink and the frame of the horizontal housing are formed from a metal material.

6. The fixed retail scanner of claim 4, wherein the heatsink provides a mounting support structure for the multi-port network switch being secured with the main board.

7. The fixed retail scanner of claim 1 wherein the heat management system further includes a fan disposed proximate a first end of the air chamber, and a heat exchanger proximate a second end of the air chamber with the condenser located therebetween, wherein the fan is configured to create air flow across the condenser.

8. The fixed retail scanner of claim 7, further comprising air vents formed in a frame of the horizontal housing proximate to the location of the fan such that air is pulled from outside of the fixed retail scanner through the air vents by the fan to the heat exchanger through the air chamber.

9. The fixed retail scanner of claim 8, wherein the air vents are formed in a side wall of the frame proximate a front region of the fixed retail scanner.

10. The fixed retail scanner of claim 8, wherein air is expelled from the air chamber through the heat exchanger out of a back region of the fixed retail scanner.

11. A fixed retail scanner including a data reader, comprising:
    a housing of the data reader;
    a main board including one or more processors disposed within the data reader housing;
    one or more camera modules disposed within the data reader housing;
    a multi-port network switch including a switch processor disposed within the data reader housing and operably coupled with the main board; and
    a heat management system disposed within the data reader housing and operably coupled with at least the multi-port network switch to dissipate heat therefrom, wherein the main board and the multi-port network switch are arranged in a stacked arrangement within the data reader housing, the heat management system including a heat pipe thermally coupled with the switch processor and extending to an air chamber within the data reader housing, wherein the heat pipe extends through a region between the multi-port network switch and the main board in the stacked arrangement.

12. The fixed retail scanner of claim 11, wherein the heat pipe is connected to a mounting structure configured to secure the multi-port network switch and the main board in the stacked arrangement.

13. The fixed retail scanner of claim 12, wherein the mounting structure and a frame of the horizontal housing are formed from a plastic material.

14. A fixed retail scanner having a multi-port network switch disposed within a bi-optic housing, comprising:
    a multi-port network switch having a switch processor;
    a heat pipe thermally coupled to the switch processor, the heat pipe thermally coupled with the switch processor and extending across at least a portion of the bi-optic housing to an air chamber formed within the bi-optic housing;
    a thermal pad coupled to a first end of the heat pipe via an evaporator; and
    a condenser coupling a second end of the heat pipe to a wall of the air chamber.

15. The fixed retail scanner of claim 13, further comprising a fan positioned proximate a first end of the air chamber, and a heat exchanger positioned proximate a second end of the air chamber.

16. The fixed retail scanner of claim 15, further comprising a cover secured over the air chamber to separate the air chamber from components in other regions of the bi-optic housing.

17. The fixed retail scanner of claim 16, wherein the multi-port network switch, the heat pipe, and the air chamber are located within a horizontal housing of the bi-optic housing.

18. A method for providing heat management of a fixed retail scanner, the method comprising:
    drawing heat away from a multi-port network switch having a switch processor via a heat pipe thermally coupled with the switch processor at a first end thereof via a thermal pad and an evaporator, the heat pipe extending across an internal region of a bi-optics housing to an air chamber where a condenser couples a second end of the heat pipe to a wall of the air chamber; and
    creating an air flow through the air chamber.

19. The method of claim 18, wherein creating an air flow through the air chamber includes drawing air from air vents formed in a side wall of a lower chassis of the fixed retail scanner and expelling the air out a back portion of the lower chassis.

20. The fixed retail scanner of claim 4, wherein the heatsink further includes a third contact point with a main processor mounted on the main board such that heat dissipation is provided to both the main board and the multi-port network switch sharing the heatsink.

* * * * *